March 30, 1937.  P. J. BRENNAN  2,075,699
PROCESS FOR MAKING BAKERS' PRODUCTS IN VARIOUS SHAPES
Filed April 22, 1936   2 Sheets-Sheet 1
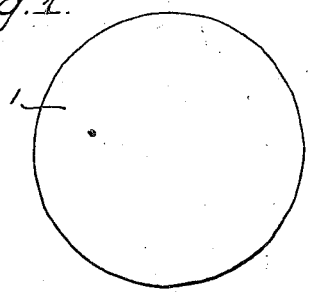
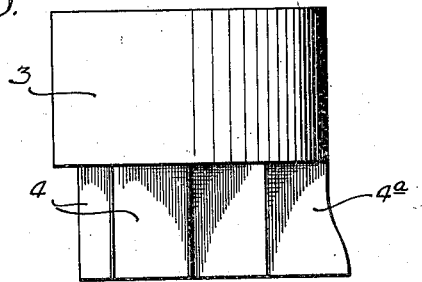
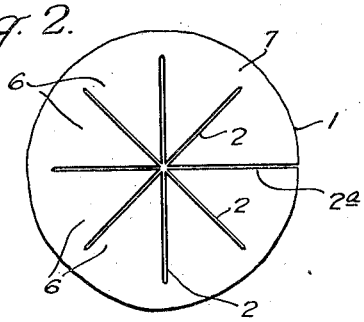
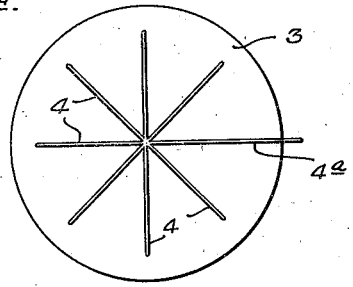
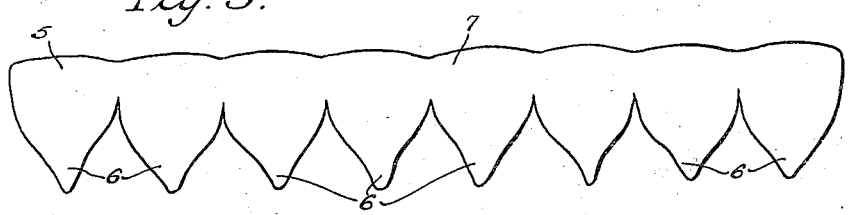
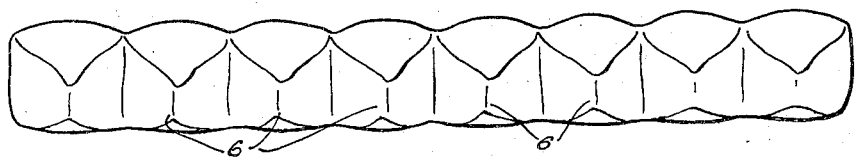
Inventor:-
Patrick J. Brennan
by his Attorneys
Howson & Howson March 30, 1937.   P. J. BRENNAN   2,075,699
PROCESS FOR MAKING BAKERS' PRODUCTS IN VARIOUS SHAPES
Filed April 22, 1936   2 Sheets-Sheet 2

Inventor:-
Patrick J. Brennan
by his Attorneys
Howson & Howson

Patented Mar. 30, 1937

2,075,699

UNITED STATES PATENT OFFICE 2,075,699

PROCESS FOR MAKING BAKERS' PRODUCTS IN VARIOUS SHAPES

Patrick J. Brennan, York, Pa., assignor of one-half to Edw. Fox Baking Co., Inc., York, Pa., a corporation of Pennsylvania Application April 22, 1936, Serial No. 75,812

3 Claims. (Cl. 107—54)

The principal object of this invention is to provide a novel and improved process for making rolls and similar products in ornamental shapes.

The invention will be readily understood from the attached drawings, in which:

Figures 1, 2 and 5 are views illustrating successive steps of the process;

Figs. 3 and 4 are side elevational and end views, respectively, of an implement that may be used in the process;

Fig. 6 is a top view of the finished product;

Figure 7:
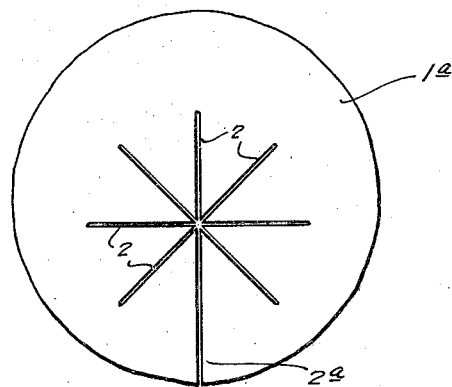
Fig. 7 is a view illustrating a modified procedure within the scope of the invention.

The properties and physical characteristics of bread and similar doughs are such that considerable difficulty is experienced in molding them to afford ornamental shapes in the finished product, and the process necessarily is so slow as to render it in most instances commercially impractical. For this reason, there is little variety in the shape of rolls and similar bakers' products, and such products, at least as regards their shape, are highly standardized.

I have discovered a method of producing rolls and similar products in a variety of different and attractive ornamental shapes which, by reason of its simplicity and the ease with which the process may be carried out, is highly practical in the commercial sense.

In accordance with my inveniton, the basic dough mass is first divided into relatively small sections, preferably, though not necessarily, substantially spherical in form, as shown, for example, in Fig. 1. In this ball 1 I form a series of incisions 2 radiating from a common center, see Fig. 2, and this center in the present instance corresponds substantially to the vertical center line of the ball 1. These incisions, with one exception, terminate short of the outer periphery of the ball 1 and extend completely through the ball from top to bottom. In the one exception, the incision 2a extends outwardly in the radial direction to and through the periphery of the ball.

The incisions 2 and 2a may be accurately and quickly made by means of a tool of the character shown in Figs. 3 and 4. This tool comprises a handle portion 3, from one face of which extends a series of radiating blades 4. One of these blades, 4a, is of greater radial extent than the other blades, as indicated. In using this tool, the outer edges of the blades are placed upon the top of the dough ball 1 and the tool pressed downwardly so that the blades are caused to penetrate the ball from top to bottom, thereby making the radiating incisions 2 and the incision 2a, which latter is formed by the extended cutting blade 4a in obvious manner. In order to prevent adherence of the wet dough to the cutting blades, the latter may be dipped, prior to the cutting operation, in butter or other suitable oil or grease, and this oily substance, being transferred from the blades to the sides of the incisions 2 and 2a, also tends to prevent readherence of the incised dough.

Subsequent to the formation of the incisions 2 and 2a as described above, the portions of the ball at opposite sides of the incision 2a are drawn away from each other and the ball opened out along the lines of the incision 2 to form a strip 5, as shown in Fig. 5, wherein the segmental portions between the adjoining incisions 2 and 2a designated in Figs. 2 and 5 by the reference numeral 6 project away from the continuous strip of the dough formed by the outer peripheral or uncut portion 7 of the dough ball. This strip is then baked in the usual manner to produce the finished product, which is shown in Fig. 6. This product not only possesses an extremely desirable and unusual ornamental configuration, but the individual segment-like portions 6 of the strip may be readily separated from the latter, which is a further desirable feature.

Figure 8:
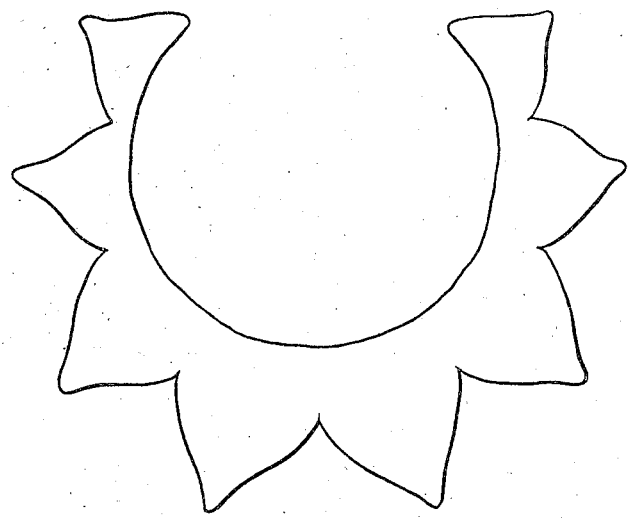
Fig. 8 is a view showing the ornamental shape of the finished product resulting from the procedure illustrated in Fig. 7.

It is possible by this same process to form a variety of different ornamental shapes. In Fig. 7, for example, I have illustrated a dough ball 1a wherein the incisions 2 and 2a radiate from a center which is eccentric with respect to the center line of the ball. When the severed ball is opened out as described above into a more or less straight strip, it will have a tapered formation by reason of the fact that the end portions of the strip will be of lesser effective thickness than the central portions. This procedure may be utilized in forming a modified crescent roll of the type shown in Fig. 8.

It will be apparent that the process in principle may produce a variety of other different shapes, depending upon the form and number of the incisions and their locations in the dough ball. While affording a molded effect in the finished product, it will be noted that the process is devoid of molding operations as such. The process is superior to the conventional die cutting method, in that it avoids waste and the necessity for reworking the dough, and is equally well adapted for both machine and hand operation.

I claim:

1. The method which consists in incising a dough mass from top to bottom along a plurality of lines radiating from a common centre to thereby form in said mass a plurality of segmental sections each connected to an adjoining section by an unsevered portion of the dough, opening out the mass from the edge thereof and along the said lines of incision, and baking the dough to form the finished product.

2. The method which consists in incising a dough mass from top to bottom along a plurality of lines radiating from a common centre within the transverse limits of the mass, one of said lines terminating at the edge of the mass and the others within said transverse limits, opening out the mass along the lines of said incisions, and baking the dough to form the finished product.

3. The method which comprises incising a dough mass from top to bottom along a plurality of lines radiating from a common centre within the transverse limits and eccentrically of the mass, one of said lines conforming substantially to the shortest radius from said centre to the edge of the mass and the other lines terminating within said transverse limits, opening out the mass from said line of shortest radius and along the lines of said incisions to form a substantially crescent-shaped mass wherein the segmental sections defined by said incisions project from the outer side of said crescent mass, and baking the dough to form the finished product.

PATRICK J. BRENNAN.